UNITED STATES PATENT OFFICE.

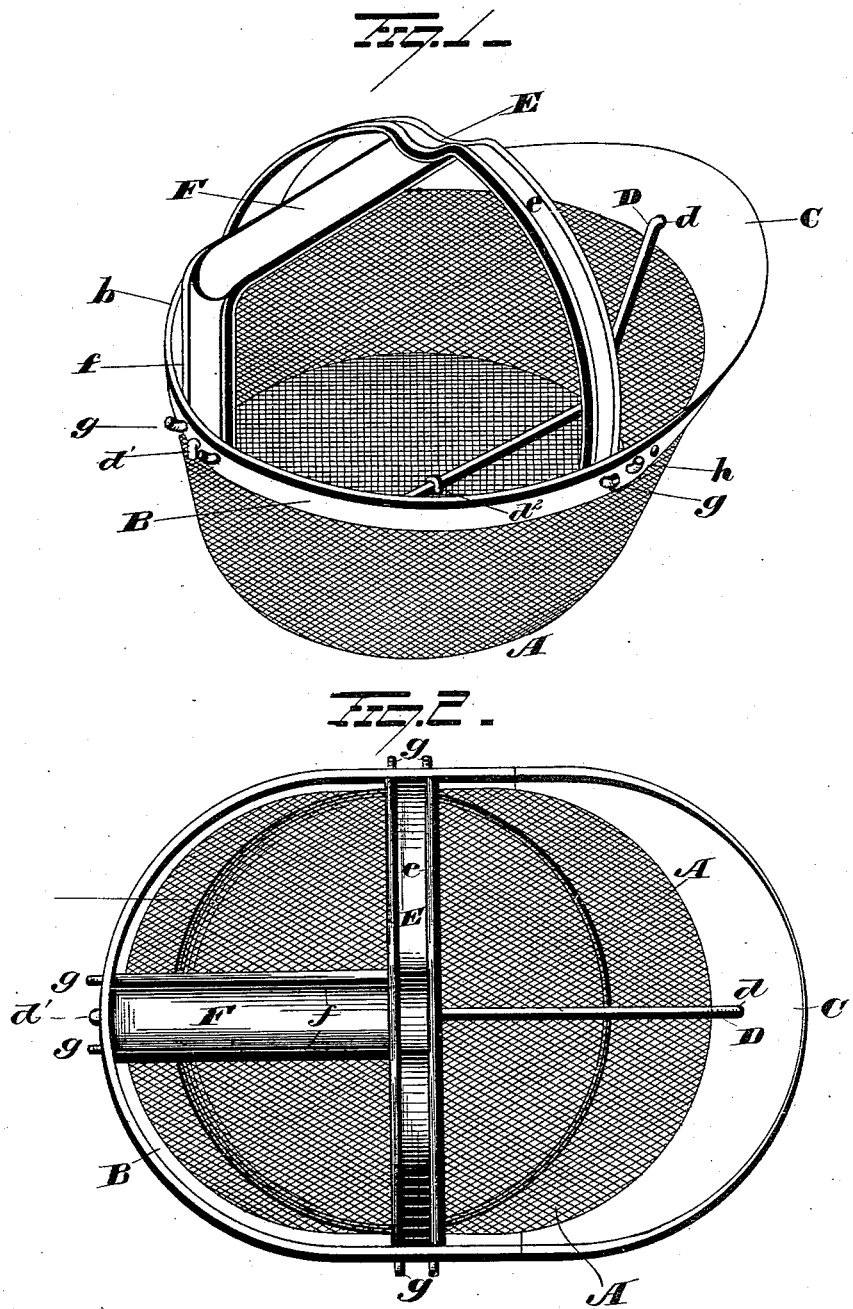

JULIUS HENNINGER, OF BLUE ISLAND, ASSIGNOR, BY MESNE ASSIGNMENTS, TO EMILY R. CHURCH, OF CHICAGO, ILLINOIS.

FLOUR-SIFTER.

SPECIFICATION forming part of Letters Patent No. 277,278, dated May 8, 1883.

Application filed October 24, 1882. (No model.)

*To all whom it may concern:*

Be it known that I, JULIUS HENNINGER, of Blue Island, in the county of Cook and State of Illinois, have invented certain new and useful Improvements in Flour-Sifters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to flour-sifters, the object being to provide a sifter of neat and durable form, which will serve also as a scoop.

The invention consists in the improved construction hereinafter described, and pointed out in the claims.

In the drawings, Figure 1 is a perspective view of a combined flour-sifter and scoop constructed in accordance with my invention. Fig. 2 is a plan view of the same.

A represents a cap-shaped sieve of wire-netting, secured to a sheet-metal frame, B, lapped over the edge of the netting, the latter being secured thereto by forming a clamping-bead, b, in the frame, and by rivets, as desired. The forward portion, C, of the frame is widened to form an inclined nose-piece or scoop end for the sifter. A longitudinal wire brace, D, bent to conform to the shape of the sifter, is secured to the frame by projecting at one end through a perforation, d, of the end C of the frame, and at the opposite end through a perforation, d', in the rear end of the frame, and being bent as shown, and to the bottom of the netting by a link, d².

I provide the sifter with a removable handle, consisting of a cross-bail, E, and a rear brace, F, provided with beads e and f, inclosing wires g. The ends of these wires are bent at right angles to the bail and brace to adapt them to enter perforations h, formed in the rear end and sides of the frame, after which they can be readily bent upon themselves, as shown in Fig. 1, to securely retain them in place. The construction of the handle adapts it to be removed during transportation. The rear brace, F, of the handle is preferably semi-circular in cross-section, and the central portion of the bail E is depressed to form an easy bearing for the hand.

The sifter as thus constructed is adapted to scoop up the flour, and its peculiar shape renders it convenient in use, and prevents any spilling of the flour. Moreover, the flour will not collect or clog within the sifter, as the wire-netting constitutes the sides as well as the bottom of the sifter.

My improvement may be manufactured at a comparatively small cost, and, as above described, is well adapted for transportation.

Having fully described my invention, what I claim as new, and desire to secure by Letters Patent, is—

1. The combination, with the cap-shaped wire-netting and a sheet-metal binding secured to its edge, said binding having an inclined scoop, C, formed integral therewith, of the bail and handle secured to the binding, substantially as set forth.

2. The combination, with the wire-netting, of a frame provided with side and end perforations, and a removable handle having wire projections adapted to enter said perforations and be turned up to secure the handle, substantially as set forth.

3. In a flour-sifter, the combination, with a cap-shaped netting, of a frame binding the edge of the latter, and provided with a forward scoop end and side and end perforations, and a removable handle consisting of a cross-bail and rear brace depressed to form a bearing for the hand, and provided with projecting wires adapted to enter the side and end perforations of the frame and be turned up to secure the handle, substantially as set forth.

In testimony that I claim the foregoing I have hereunto set my hand this 22d day of July, 1882.

JULIUS HENNINGER.

Witnesses:
W. A. MCCLELLAND,
H. L. CHURCH.